United States Patent
Toguchi et al.

(10) Patent No.: US 8,582,964 B2
(45) Date of Patent: Nov. 12, 2013

(54) IMAGING DEVICE AND CONTROL METHOD THEREOF

(75) Inventors: Masaaki Toguchi, Toyota (JP); Tetsuya Horike, Obu (JP)

(73) Assignee: Elmo Company, Limited, Mizuho-ku, Nagoya (JP)

( * ) Notice: Subject to any disclaimer, the term of this patent is extended or adjusted under 35 U.S.C. 154(b) by 0 days.

(21) Appl. No.: 13/548,545

(22) Filed: Jul. 13, 2012

(65) Prior Publication Data

US 2013/0022342 A1    Jan. 24, 2013

(30) Foreign Application Priority Data

Jul. 19, 2011    (JP) .................................. 2011-157970

(51) Int. Cl.
   *G03B 17/00*    (2006.01)
(52) U.S. Cl.
   USPC .............................................. 396/77; 396/81
(58) Field of Classification Search
   USPC ........................... 396/72, 76–83; 355/55, 56; 359/696–698
   See application file for complete search history.

(56) References Cited

U.S. PATENT DOCUMENTS

| 4,611,244 A * | 9/1986 | Hanma et al. ................. 348/347 |
| 4,786,987 A * | 11/1988 | Fujimura et al. ............. 386/225 |
| 4,870,439 A * | 9/1989 | Tsuboi et al. ................... 396/77 |
| 5,363,164 A * | 11/1994 | Kobayashi et al. ............ 396/77 |
| 5,400,110 A * | 3/1995 | Soshi et al. ..................... 396/81 |
| 5,615,398 A * | 3/1997 | Matsuyama .................... 396/77 |
| 2013/0022342 A1 * | 1/2013 | Toguchi et al. ................. 396/82 |

FOREIGN PATENT DOCUMENTS

| JP | 05-300422 A | 11/1993 |
| JP | 07-143382 A | 6/1995 |
| JP | 2005-249879 A | 9/2005 |
| JP | 2007-116305 A | 5/2007 |
| JP | 2007-221375 | 8/2007 |

* cited by examiner

*Primary Examiner* — William B. Perkey
(74) *Attorney, Agent, or Firm* — Maine Cernota & Rardin

(57) ABSTRACT

An imaging device moves a zoom lens, so as to change the magnification of an image of a subject, and obtains a near limit position of a focusing lens to the subject at a zoom lens position. When a target position of the focusing lens, which is required to keep the image in focus after the zoom lens is moved, is located on a near side, i.e., on an imaging plane side, of a threshold position determined based on the obtained near limit position, focus control is performed to move the focusing lens and thereby focus. When the target position of the focusing lens is not located on the near side but is located on a subject side of the threshold position, on the other hand, focus control is performed to move the zoom lens to a wider position and subsequently move the focusing lens to focus the image.

8 Claims, 6 Drawing Sheets

IMAGING DEVICE AND CONTROL METHOD THEREOF

CROSS REFERENCE TO RELATED APPLICATIONS

This application claims the priority based on Japanese Patent Application No. 2011-157970 filed on Jul. 19, 2011, the disclosure of which is hereby incorporated by reference in its entirety.

BACKGROUND

1. Technical Field

The invention relates to taking an image of a subject by focusing the image on an imaging plane via an optical system including a zoom lens and a focusing lens.

2. Description of the Related Art

With advancement of digital technology, imaging devices, such as digital still cameras and digital video cameras, have widely been used in various fields. The imaging device generally has a zoom mechanism and an auto focusing mechanism. The zoom mechanism moves a zoom lens in response to the operator's zoom operation to change the magnification of an image of a subject. The auto focusing mechanism moves a focusing lens to focus on the subject.

The imaging device typically has a mode for close-up photography called "macro mode". In close-up or macro photography, the auto focusing mechanism may fail to focus on the subject in the standard mode. In such cases, the image of the subject in close-up distance can be kept in focus by photography in the macro mode. Switching between the standard mode and the macro mode is conventionally performed by the operator's operation of a specified switch.

The operator is accordingly required to perform troublesome switching between the standard mode and the macro mode and may take an image out of focus in macro or close-up photography if the switching is not adequately performed.

Consequently, by taking into account the above problem, there is a need to readily and reliably take an image in focus in macro or close-up photography.

SUMMARY

In order to achieve at least part of the foregoing, the present invention provides various aspects and embodiments described below.

A first aspect directs to an imaging device that takes an image of a subject by focusing the image on an imaging plane via an optical system including a zoom lens and a focusing lens. The imaging device comprises: an operation input unit configured to input a zoom operation; a zoom controller configured to move the zoom lens in response to the input zoom operation, so as to change a magnification of the image; a near limit position acquirer configured to obtain a near limit position of the focusing lens to the subject at a zoom lens position, to which the zoom lens is moved by the zoom controller; and a focus controller configured to move the focusing lens in such a range that the focusing lens is not located on a near side of the near limit position, every time the zoom lens is moved by the zoom controller, so as to focus the image on the imaging plane. When a target position of the focusing lens, which is required to keep the image in focus after the zoom lens is moved by the zoom controller, is located on the near side of a threshold position that is specified based on the near limit position, the focus controller moves the zoom lens to a wider position than the zoom lens position, to which the zoom lens is moved by the zoom controller, and subsequently moves the focusing lens to focus the image.

In the imaging device according to the first aspect, when the target position of the focusing lens, which is required to keep the image in focus on the imaging plane after the zoom lens is moved by the zoom controller, is located on the near side of the threshold position that is specified based on the near limit position, the focus controller moves the zoom lens to the wider position and subsequently moves the focusing lens to focus the image. Even in the case that moving the focusing lens to the near side of the near limit position is required to focus the image, the focus controller focuses the image after moving the zoom lens to the wider position. This configuration enables the operator to readily and reliably take an image in focus in macro or close-up photography.

According to one embodiment, there is provided the imaging device of the first aspect, wherein the focus controller may analyze the image on the imaging plane to obtain an evaluation value indicating a focal state on the imaging plane. Prior to moving the focusing lens to take the image of the subject, the focus controller may successively change a position of the focusing lens with shooting the subject and determine the target position of the focusing lens, based on a variation in evaluation value obtained at every change in position of the focusing lens.

The imaging device of this embodiment obtains the evaluation value indicating the focal state with successively changing the position of the focusing lens, and determines the target position of the focusing lens, based on the variation in evaluation value. This configuration enables the target position of the focusing lens to be determined with high accuracy.

According to another embodiment, there is provided the imaging device of the first aspect, wherein the focus controller moves the zoom lens to a most telephoto position in a shortest shooting distance, as moving the zoom lens to the wider position.

The imaging device of this embodiment moves the zoom lens to the wider position to compensate for the shortest shooting distance and subsequently moves the focusing lens to focus the image. This configuration enables the image to be in focus when the subject is in the close-up distance.

According to a second aspect directs to an imaging device that takes an image of a subject by focusing the image on an imaging plane via an optical system including a zoom lens and a focusing lens. The imaging device comprises: an operation input unit configured to input a zoom operation; a zoom controller configured to move the zoom lens in response to the input zoom operation, so as to change a magnification of the image; a shortest shooting distance acquirer configured to obtain a shortest shooting distance of the subject at a zoom lens position, to which the zoom lens is moved by the zoom controller; a focus controller configured to move the focusing lens every time the zoom lens is moved by the zoom controller, so as to focus the image on the imaging plane; and an actual shooting distance acquirer configured to obtain an actual shooting distance to the subject. When the actual shooting distance is less than the shortest shooting distance, the focus controller moves the zoom lens to a wider position than the zoom lens position, to which the zoom lens is moved by the zoom controller, and subsequently moves the focusing lens to focus the image.

When the actual shooting distance is less than the shortest shooting distance, the imaging device of the second aspect moves the zoom lens to the wider position and subsequently moves the focusing lens to focus the image. Even in the case that focusing is difficult due to the extremely short actual shooting distance, the focus controller focuses the image after moving the zoom lens to the wider position. This configuration enables the operator to readily and reliably take an image in focus in macro or close-up photography.

According to one embodiment, there is provided the imaging device of the second aspect further comprising: a main unit; a camera configured to have the optical system; an arm coupled with the main unit and configured to have the camera attached on one end thereof; and an adjustment mechanism configured to adjust at least an angle of inclination of the arm to the main unit, so as to change a distance from the subject to the imaging plane. The actual distance acquirer obtains the actual shooting distance to the subject from a state of the adjustment mechanism.

The imaging device of this embodiment enables the actual shooting distance to the subject to be readily obtained from the state of the adjustment mechanism.

According to another embodiment, there is provided the imaging device of the second aspect, wherein the focus controller moves the zoom lens to a most telephoto position in a shortest shooting distance, as moving the zoom lens to the wider position.

The imaging device of this embodiment moves the zoom lens to the wider position to compensate for the shortest shooting distance and subsequently moves the focusing lens to focus the image. This configuration enables the image to be in focus when the subject is in the close-up distance.

The present invention may be implemented by a variety of aspects and applications other than those described above, for example, a method of controlling the imaging device to implement the functions of the respective components included in the imaging device of the first aspect, a method of controlling the imaging device to implement the functions of the respective components included in the imaging device of the second aspect, and computer programs executed to implement these methods of controlling the imaging device. Such computer programs may be stored in any of various computer readable storage media. Typical examples of the storage media include magnetic disks, optical disks, memory cards and hard disks.

DESCRIPTION OF THE PREFERRED EMBODIMENTS

Some embodiments of the invention are described below with reference to the accompanying drawings.

A. First Embodiment

A-1. General Configuration of Information Providing Device 10

Figure 1:
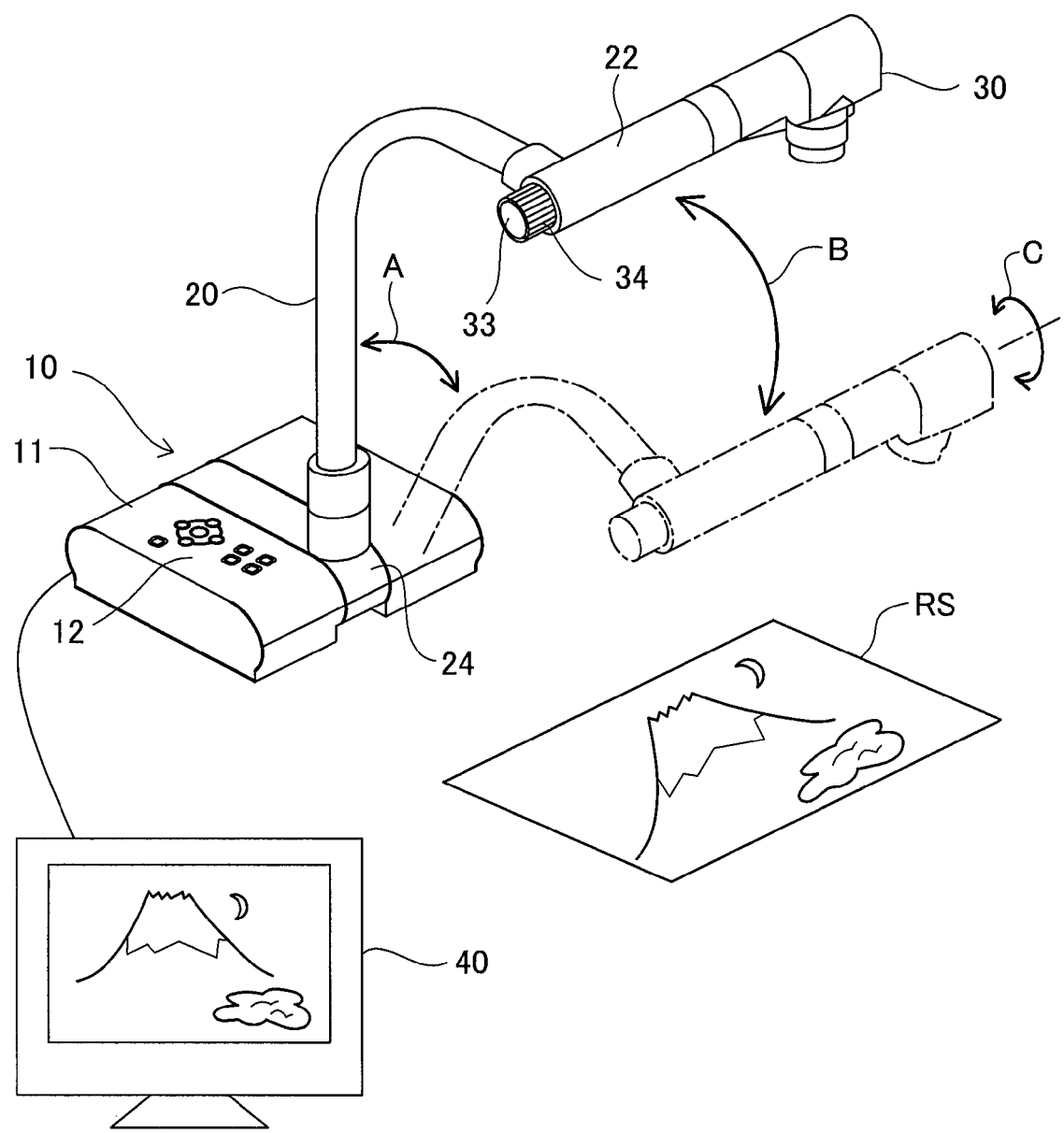
FIG. 1 is a diagram illustrating an information providing device and its periphery according to a first embodiment of the invention.

FIG. 1 is a diagram illustrating an information providing device 10 and its periphery according to a first embodiment of the invention. The information providing device 10 includes a main unit 11 placed on, for example, desktop, a curved arm 20 extended upward from the main unit 11, a cylindrical body 22 fixed to an upper end of the arm 20 at a right angle and a camera head 30 provided on one end of the cylindrical body 22.

An operation panel 12 operated by the operator is provided on the upper surface of the main unit 11. The operation panel 12 includes various switches and buttons, e.g., a power switch, buttons operated to adjust the focal position, and buttons operated to adjust the brightness of an image. Various input and output terminals, for example, a DC power terminal, input and output terminals of analog RGB, and a USB terminal (not shown) are provided on the rear surface of the main unit 11. According to this embodiment, a display device 40 is connected to the output terminal of analog RGB via a cable. The display device 40 may be, for example, a CRT, a liquid crystal display, a projector or a TV set.

The camera head 30 internally has a CCD video camera. The information providing device 10 takes an image of a material (subject) RS placed on, for example, the desktop at a specified number of frames, for example, 30 frames, per unit time. A video signal obtained by such imaging is output to the display device 40 and is displayed on the display device 40. The image of the material RS is accordingly displayed on the display device 40.

An auto focus (AF) button 33 operated to give an instruction of auto focusing and a zoom dial 34 operated to give an instruction of zoom control are provided on the other end of the cylindrical body 22 opposite to the camera head 30-end. The AF button 33 and the zoom dial 34 are operated by the operator. A press of the AF button 33 gives the instruction of auto focusing.

The zoom dial 34 is structured to allow the operator's turning operation clockwise or counterclockwise from a fixed position. The zoom dial 34 generates a restoring force of returning to the fixed position, in response to the turning operation. The turning zoom dial 34 returns to the fixed position at the end of the turning operation. The turning direction and the turning time of the zoom dial 34 specify the zoom factor. It may be assumed that turning clockwise is zooming in and turning counterclockwise is zooming out. For example, turning clockwise for one second specifies the zoom factor of 1.1; turning clockwise for two seconds specifies the zoom factor of 1.2; turning counterclockwise for one second specifies the zoom factor of 0.9; and turning counterclockwise for two seconds specifies the zoom factor of 0.8.

The zoom dial 34 corresponds to the "operation input section" in the disclosure of the first aspect described in SUMMARY. The AF button 33 and the zoom dial 34 are not necessarily placed on the cylindrical body 22 but may be provided at a different location, for example, on the operation panel 12. In the application providing on the operation panel 12, the zoom dial 34 may be replaced with buttons operated to specify the zoom factor.

In the information providing device 10, the arm 20 is pivotally supported at a lower end of the arm 20 by a pivot shaft mechanism 24 to be rotatable as shown by an arrow A. The cylindrical body 22 with the camera head 30 is thus movable and rotatable as shown by an arrow B. The camera head 30 is rotatable about the central axis of the cylindrical body 22 as shown by an arrow C. The position and the direction of the camera head 30 may be changed with high flexibility by rotating the arm 20 and rotating the camera head 30.

A-2. Configuration of Video Camera 90

Figure 2:
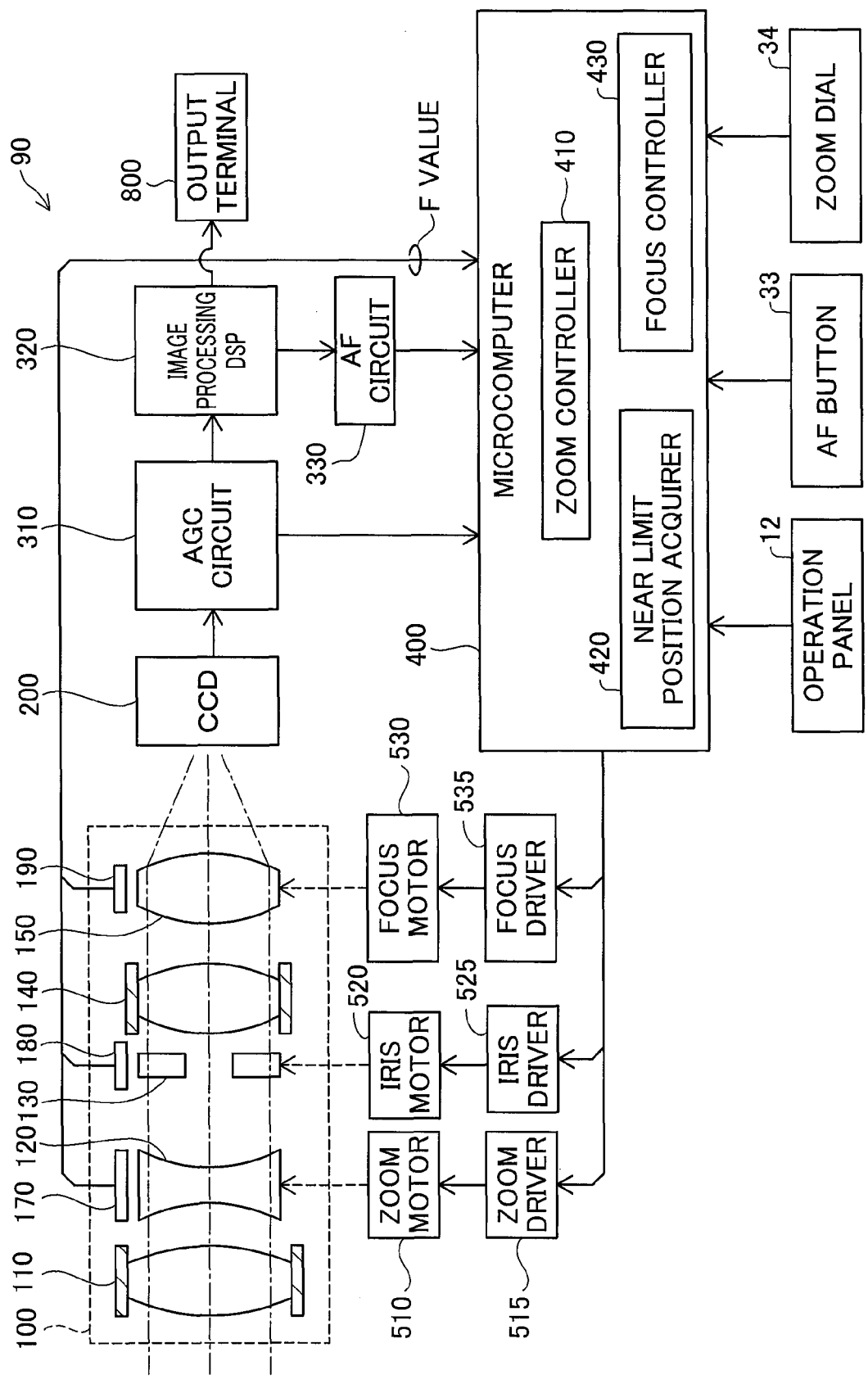
FIG. 2 is a block diagram illustrating the general configuration of a video camera provided in a camera head of the information providing device.

FIG. 2 is a block diagram illustrating the general configuration of a video camera 90 provided in the camera head 30. As illustrated, the video camera 90 according to this embodiment includes a lens unit 100, a CCD 200, an AGC circuit 310, an image processing DSP (Digital Signal Processor) 320, an auto focusing (AF) circuit 330 and a microcomputer 400.

The lens unit 100 includes a stationary first lens 110, a zoom lens 120 movable along the optical axis to change the magnification, an iris mechanism 130 operable to regulate the amount of light transmitted through the unit, a stationary third lens 140 and a focusing lens 150 movable along the optical axis to adjust the focal position, which are arranged sequentially from the proximity to the subject. In the inner-focusing lens unit, the zoom lens and the focusing lens may be called variator lens and compensator lens, respectively.

The zoom lens 120 is connected with a zoom motor 510 equipped with a lead screw of moving back and forth the zoom lens 120 along the optical axis. The zoom motor 510 is a stepping motor and is connected with the microcomputer 400 via a zoom driver 515 for driving the zoom motor 510. The zoom lens 120 accordingly moves along the optical axis in the lens unit 100 according to the number of steps specified by the microcomputer 400 to perform the operation of changing the magnification, i.e., zoom control.

The focusing lens 150 is connected with a focus motor 530 equipped with a lead screw of moving back and forth the focusing lens 150 along the optical axis. The focus motor 530 is a stepping motor and is connected with the microcomputer 400 via a focus driver 535 for driving the focus motor 530. The focusing lens 150 accordingly moves along the optical axis in the lens unit 100 according to the number of steps specified by the microcomputer 400 to perform the operation of adjusting the focal position, i.e., focus control.

The iris mechanism 130 is connected with an iris motor 520 of adjusting the aperture of the iris mechanism 130. The iris motor 520 is a galvanometer and is connected with the microcomputer 400 via an iris driver 525 for driving the iris motor 520. The iris mechanism 130 accordingly regulates the amount of light transmitted through the lens unit 100, in response to an instruction from the microcomputer 400. According to this embodiment, the zoom motor 510 and the focus motor 530 are the stepping motors and the iris motor 520 is the galvanometer. Other types of motors, such as DC motors, may be employed for the same purpose.

As described above, the zoom lens 120 and the focusing lens 150 move along the optical axis in the lens unit 100. The lens unit 100 is accordingly provided with a first origin sensor 170 and a second origin sensor 180 to detect whether these lenses 120 and 150 move to the respective origins specified in advance as reference positions. The first origin sensor 170 and the second origin sensor 180 are structured by photo interrupters and are connected with the microcomputer 400. The microcomputer 400 uses these origin sensors 170 and 180 to accurately adjust the position of the zoom lens 120 and the position of the focusing lens 150.

The CCD 200 is an image sensor serving to receive the light transmitted through the lens unit 100 and convert the received light into electrical signal. The imaging plane of the CCD 200 corresponds to the "imaging plane" in the disclosure of the first aspect described in SUMMARY.

The AGC circuit 310 serves to receive the electrical signal output from the CCD 200 and amplify the received electrical signal to an adequate output level.

The image processing DSP 320 serves to receive the electrical signal from the AGC circuit 310 and make the received electrical signal subjected to analog-to-digital conversion, so as to generate image data. The image processing DSP 320 also serves to convert the generated image data into composite video signal or S video signal and output the converted signal via an output terminal 800 to an external device, such as a TV monitor or a recording device. The image processing DSP 320 further serves to extract a luminance signal from the image data generated by analog-to-digital conversion and output the extracted luminance signal to the AF circuit 330. The image processing DSP 320 additionally has various image processing functions, for example, gamma correction, aperture compensation and white balance adjustment of image data.

The AF circuit 330 includes a high-pass filter, an absolute value circuit, a gate circuit and a detector circuit. The AF circuit 330 serves to receive the luminance signal from the image processing DSP 320, extract a high-frequency component from the received luminance signal by the high-pass filter and change the extracted high-frequency component to an absolute value by the absolute value circuit. The AF circuit 330 also serves to extract only a high-frequency component within a specified measurement range from the absolute value of the high-frequency component by the gate circuit and detect a peak from the extracted high-frequency component to generate an AF evaluation value by the detector circuit. The AF circuit 330 serves to output the generated AF evaluation value to the microcomputer 400. The AF evaluation value has the higher value in the better focal state of the focusing lens 150.

The operation panel 12, the AF button 33 and the zoom dial 34 described above with reference to FIG. 1 are all connected with the microcomputer 400. When the operator operates the operation panel 12, the AF button 33 or the zoom dial 34, its operation instruction is transmitted to the microcomputer 400. The microcomputer 400 drives and controls the relevant motor, for example, the zoom motor 510 or the focus motor 530, to perform the zoom control or the focus control, in response to the transmitted operation instruction.

The information providing device 10 of the embodiment has two different types of focusing functions, i.e., manual focusing function to manually adjust the focus and auto focusing function to automatically adjust the focus. The manual focusing function is enabled by the operator's operation of the buttons for adjusting the focal position provided on the operation panel 12. In other words, the operator operates the buttons for adjusting the focal position provided on the operation panel 12 to manually adjust the focus.

The auto focusing function is enabled by the operator's operation of the AF button 33. In other words, the operator presses the AF button 33 to automatically adjust the focus. The information providing device 10 employs the one-shot auto focusing system, which disables the auto focusing function once the focus is adequately adjusted, and keeps the adjusted focal position.

According to this embodiment, the auto focusing function is also enabled by the operator's operation of the zoom dial 34. The microcomputer 400 accordingly enables the auto focusing function of automatically adjusting the focus, in response to the operator's press of the AF button 33 or the operator's operation of the zoom dial 34. According to another embodiment, the auto focusing function may not be enabled by the operator's operation of the zoom dial 34. According to yet another embodiment, the operator may set in advance whether the auto focusing function is to be enabled, in association with the operation of the zoom dial 34.

The microcomputer 400 executes a computer program stored in its own memory to perform the zoom control and the focus control. The microcomputer 400 accordingly implements the functions of a zoom controller 410, a near limit position acquirer 420 and a focus controller 430, which respectively correspond to the zoom controller, the near limit position acquirer and the focus controller in the disclosure of the first aspect described in SUMMARY. The details of the respective functional blocks 410 to 430 will be described later. The memory storing the computer program may be replaced with any of various media, such as a magnetic disk, an optical disk, a memory card or a hard disk.

A-3. Software Configuration

Figure 3:
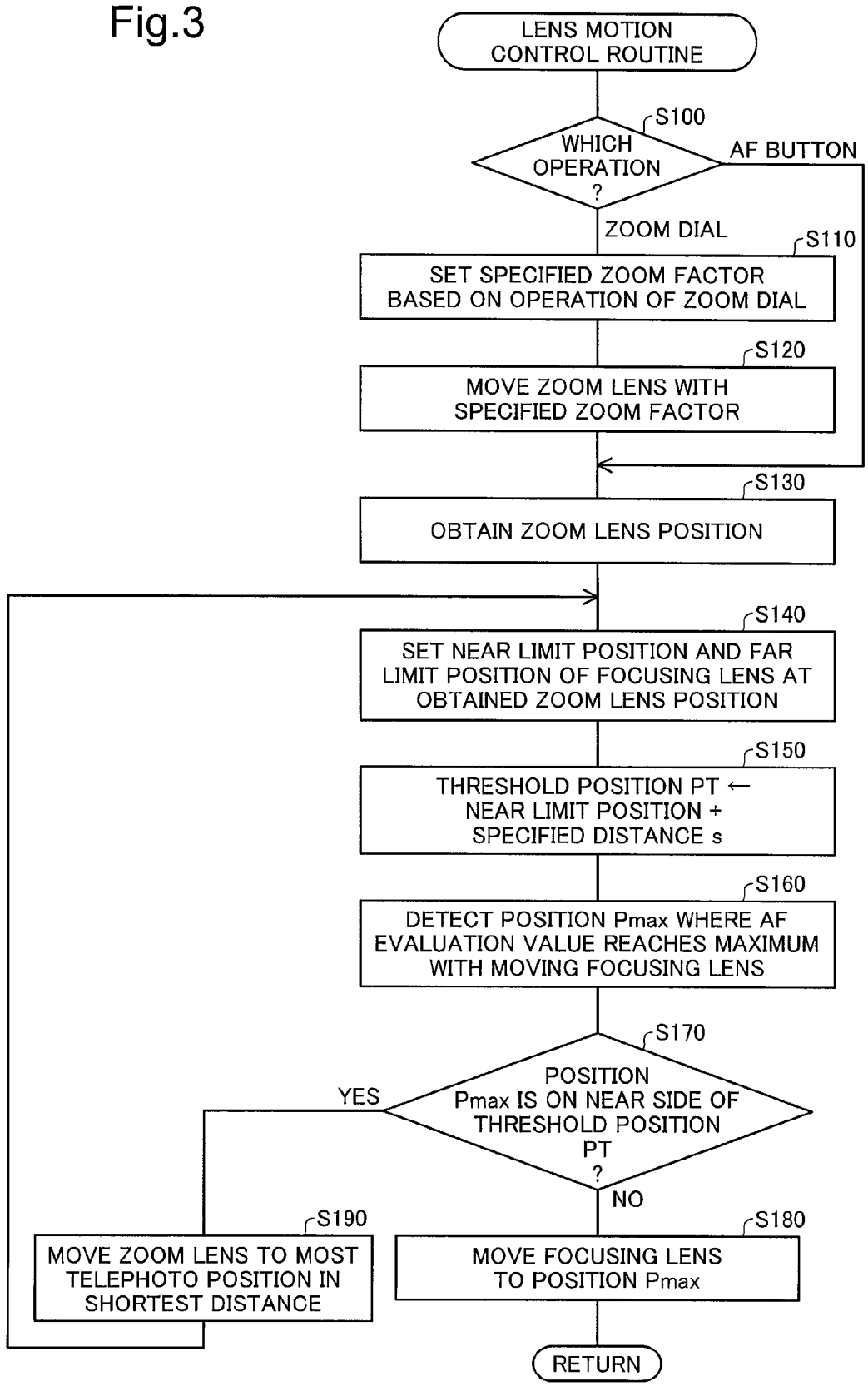
FIG. 3 is a flowchart showing a procedure of lens motion control routine performed by a microcomputer in the information providing device.

FIG. 3 is a flowchart showing a procedure of lens motion control routine performed by the microcomputer 400. This lens motion control routine is executed to perform the zoom control and the focus control described above and is triggered by the press of the AF button 33 or the operation of the zoom dial 34.

As shown in FIG. 3, the microcomputer 400 first identifies whether the operation triggering the lens motion control routine is the operation of the AF button 33 or the operation of the zoom dial 34 (step S100). When the triggering operation is identified as the operation of the zoom dial 34, the microcomputer 400 obtains the operation amount of the zoom dial 34 and sets a zoom factor based on the obtained operation amount (step S110). The zoom factor is specified by the microcomputer 400 and is hereinafter referred to as "specified zoom factor".

After the setting at step S110, the microcomputer 400 drives the zoom motor 510 with the specified zoom factor to change the magnification of a taken image to the specified zoom factor (step S120). This changes the magnification to the zoom factor specified by the operation of the zoom dial 34. The processing of steps S110 and S120 namely corresponds to the zoom control. The microcomputer 400 executes the processing of steps S110 and S120 to implement the function of the zoom controller 410 (FIG. 2).

The microcomputer 400 then obtains the current zoom lens position from the detection signal of the first origin sensor 170 (step S130).

The microcomputer 400 subsequently sets a near limit position and a far limit position of the focusing lens 150 at the zoom lens position obtained at step S130 (step S140). The focus range of the focusing lens 150 where the focal position of the focusing lens 150 is placed on the subject, i.e., where an image taken by the CCD 200 is kept in focus, is changed depending on the position of the zoom lens 120. At the focal position, the image of the subject is in focus. On the assumption that this focus range is specified by the near limit position and the far limit position, the near limit position and the far limit position of the focusing lens 150 at the zoom lens position obtained at step S130 are set at step S140 by the procedure described below. In the description hereof, the near limit position means a limit position in the near direction in the focus range of the focusing lens, and the far limit position means a limit position in the far direction in the focus range of the focusing lens.

The focus range of the focusing lens where the image is kept in focus at each zoom lens position is measured experimentally with successively changing the zoom lens position. Each focus range is specified by the near limit position and the far limit position. The correlation of the near limit position and the far limit position to the zoom lens position is recorded in the form of a table, and table data representing this table is stored in the memory of the microcomputer 400. At step S140, the microcomputer 400 refers to the table data and reads out and sets the near limit position and the far limit position corresponding to the zoom lens position obtained at step S130. The microcomputer 400 executes the processing of step S140 to implement the function of the near limit position acquirer 420 (FIG. 2).

After the setting at step S140, the microcomputer 400 sets a threshold position PT used for the determination at step S170 (step S150). More specifically, a position moving from the near limit position set at step S140 by a specified small distance s in the far direction is set as the threshold position PT.

The microcomputer 400 successively inputs the AF evaluation value from the AF circuit 330 while moving the focusing lens 150 and detects a peak position Pmax where the AF evaluation value reaches its maximum (step S160). This step is part of auto focusing control widely known as "hill-climbing control" and is specifically performed as discussed below.

Figure 4:
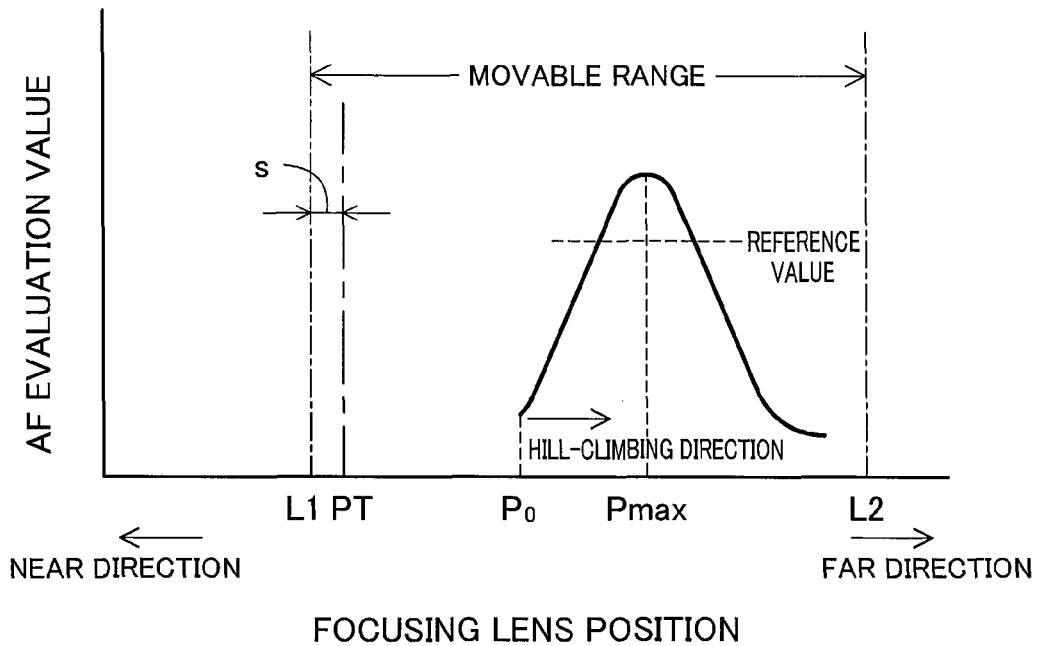
FIG. 4 is a diagram illustrating hill-climbing control.

FIG. 4 is a diagram illustrating hill-climbing control. The hill-climbing control moves the focusing lens 150 by microvibration along the optical axis from a current position P0 and identifies the hill-climbing direction of the AF evaluation value based on a variation of the successively input AF evaluation value. The hill-climbing control subsequently moves the focusing lens 150 in the identified hill-climbing direction and detects the peak position Pmax where the input AF evaluation value reaches the maximum. The range of moving the focusing lens 150 is restricted within the focus range between a near limit position L1 and a far limit position L2 set at step S140. This focus range is hereinafter referred to as "movable range". The presence of a peak is identified by detecting a specific position where the AF evaluation value takes a downward turn after exceeding a reference value. The peak position Pmax is detected as the position where the AF evaluation value reaches the maximum at step S160 and corresponds to the "target position of the focusing lens" in the disclosure of the first aspect described in SUMMARY.

There may be a case in which no peak as a hilltop is found in the movable range but the AF evaluation value has a maximum value at the near limit position L1. In this case, the near limit position L1 is detected as the peak position Pmax where the AF evaluation value reaches the maximum at step S160. This is described more in detail later.

After the detection at step S160, the microcomputer 400 determines whether the peak position Pmax detected at step S160 is located on the near side (i.e., on the subject side) of the threshold position PT set at step S150 (step S170). When the peak position Pmax is not located on the near side of the threshold position PT, the microcomputer 400 proceeds to step S180 to move the focusing lens 150 to the peak position Pmax detected at step S160.

In the illustrated example of FIG. 4, the peak position Pmax is located on the far side of the threshold position PT, so that the focusing lens 150 is moved to the peak position Pmax. This automatically focuses on the subject and enables the image of the subject to be focused on the imaging plane. The processing of steps S130 to S180 corresponds to the focus control in the standard mode. After moving the focusing lens 150, the lens motion control routine is terminated.

When the operation triggering the lens motion control routine is identified as the operation of the AF button 33 at step S100, on the other hand, the microcomputer 400 skips the zoom control of steps S110 and S120 and proceeds to step S130 to perform the focus control.

The hill-climbing control as shown in FIG. 4 is enabled in standard photography with normal shooting distance. In macro or close-up photography, the peak position Pmax where the AF evaluation value reaches the maximum may be undetectable.

Figure 5:
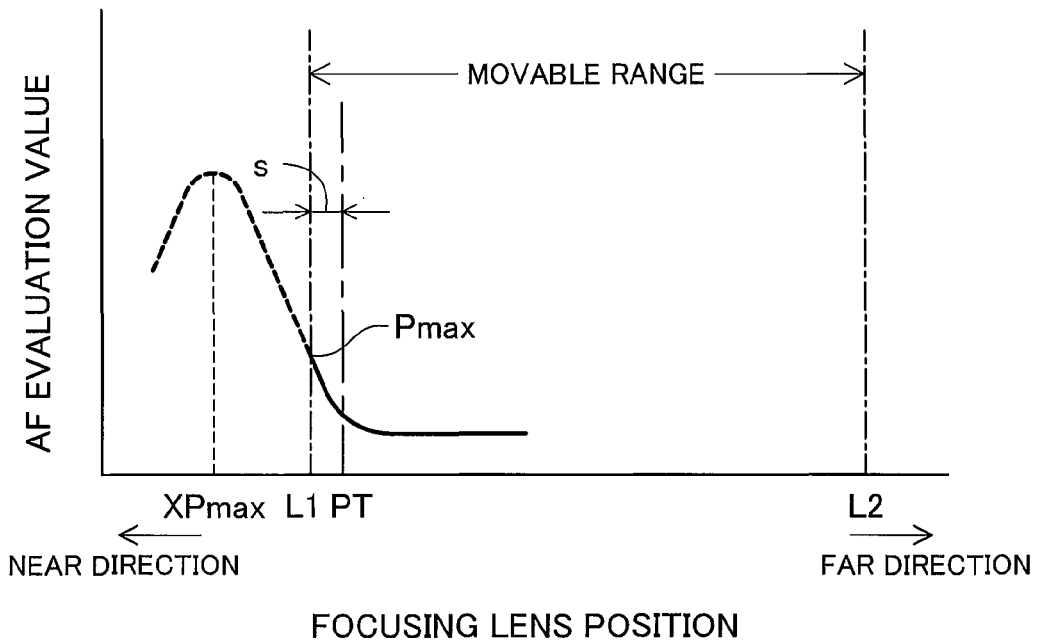
FIG. 5 is a diagram illustrating a variation in AF evaluation value in macro photography.

FIG. 5 is a diagram illustrating a variation in AF evaluation value in macro photography. As illustrated, in macro photography, a peak position XPmax where the AF evaluation value reaches the maximum may be located on the near side of the near limit position L1. The peak position Pmax shown in FIG. 4 and the peak position XPmax shown in FIG. 5 correspond to the "target position of the focusing lens" in the disclosure of the first aspect described in SUMMARY. The peak position XPmax is accordingly the target position of the focusing lens 150 required to keep the image in focus. In the illustrated example of FIG. 5, the peak position Pmax detected at step S160 is the near limit position L1. This means that the peak position Pmax is located on the near side of the threshold position PT.

With reference back to the flowchart of FIG. 3, when it is determined at step S170 that the peak position Pmax is located on the near side of the threshold position PT, the microcomputer 400 proceeds to step S190. In the illustrated example of FIG. 5, the peak position Pmax is located on the near side of the threshold position PT, so that the microcomputer 400 proceeds to step S190.

At step S190, the microcomputer 400 moves the zoom lens 120 to a most telephoto position in a shortest shooting distance of the video camera 90. The shortest shooting distance is hereinafter referred to as "shortest distance". The shortest distance depends on the product specification of the information providing device 10. The most telephoto position, to which the zoom lens 120 is to be moved, is determined according to this shortest distance and the design data of the zoom lens 120. After moving the zoom lens 120 at step S190, the microcomputer 400 returns to step S140. The focus control of and after step S140 is then performed again after the zoom lens 120 is moved to the most telephoto position in the shortest distance.

The zoom control at step S190 moves the zoom lens 120 to the wider position than the original position prior to the zoom control and thereby extends the movable range of the focusing lens 150 shown in FIG. 5 in the near direction. This causes the target position XPmax of the focusing lens 150 to be not located on the near side of the threshold position PT and results in the negative answer at step S170. In response to the negative answer at step S170, the microcomputer 400 goes to step S180 to move the focusing lens 150 to the position Pmax detected by the hill-climbing control at step S160 after the zoom control at step S190. Such control changes the magnification to the zoom factor corresponding to the most telephoto position of the zoom lens 120 in the shortest shooting distance of the video camera 90 and focuses the image of the subject on the imaging plane with the changed magnification.

This process of performing the focus control with the changed magnification enables the magnification to be changed to the zoom factor corresponding to the most telephoto position of the zoom lens in the shortest shooting distance of the video camera and is thus called "macro mode". The microcomputer 400 performs the processing of steps S120 to S190 to implement the function of the focus controller 430 (FIG. 2). More specifically, the zoom control at step S190 and the subsequent focus control at steps S140 to S180 correspond to the "focus controller moves the zoom lens to a wider position than the zoom lens position, to which the zoom lens is moved by the zoom controller, and subsequently moves the focusing lens to focus the image" in the disclosure of the first aspect described in SUMMARY.

A-4. Advantageous Effects of Embodiment

As described above, when the subject is in the close-up distance, the information providing device 10 of the first embodiment automatically moves the zoom lens to the wider position, in order to focus the image of the subject on the imaging plane. The operator can thus readily and reliably take the image in focus in macro or close-up photography.

B. Second Embodiment

The following describes an information providing device 1010 according to a second embodiment of the invention. The information providing device 1010 of the second embodiment differs from the information providing device 10 of the first embodiment only by addition of an angle sensor 900 (FIG. 7) provided in the pivot shaft mechanism 24 of pivotally supporting the arm 20 to measure the angle of inclination of the arm 20 and otherwise has the similar hardware configuration. The information providing device 1010 of the second embodiment has different software configuration from that of the information providing device 10 of the first embodiment as described below. In other words, the microcomputer 400 executes a different lens motion control routine in the second embodiment, instead of the lens motion control routine shown in FIG. 3. In the description hereinafter, the like components of the second embodiment to those of the first embodiment are expressed by the like numerical symbols. The pivot shaft mechanism 24 corresponds to the "adjustment mechanism" in SUMMARY.

Figure 6:
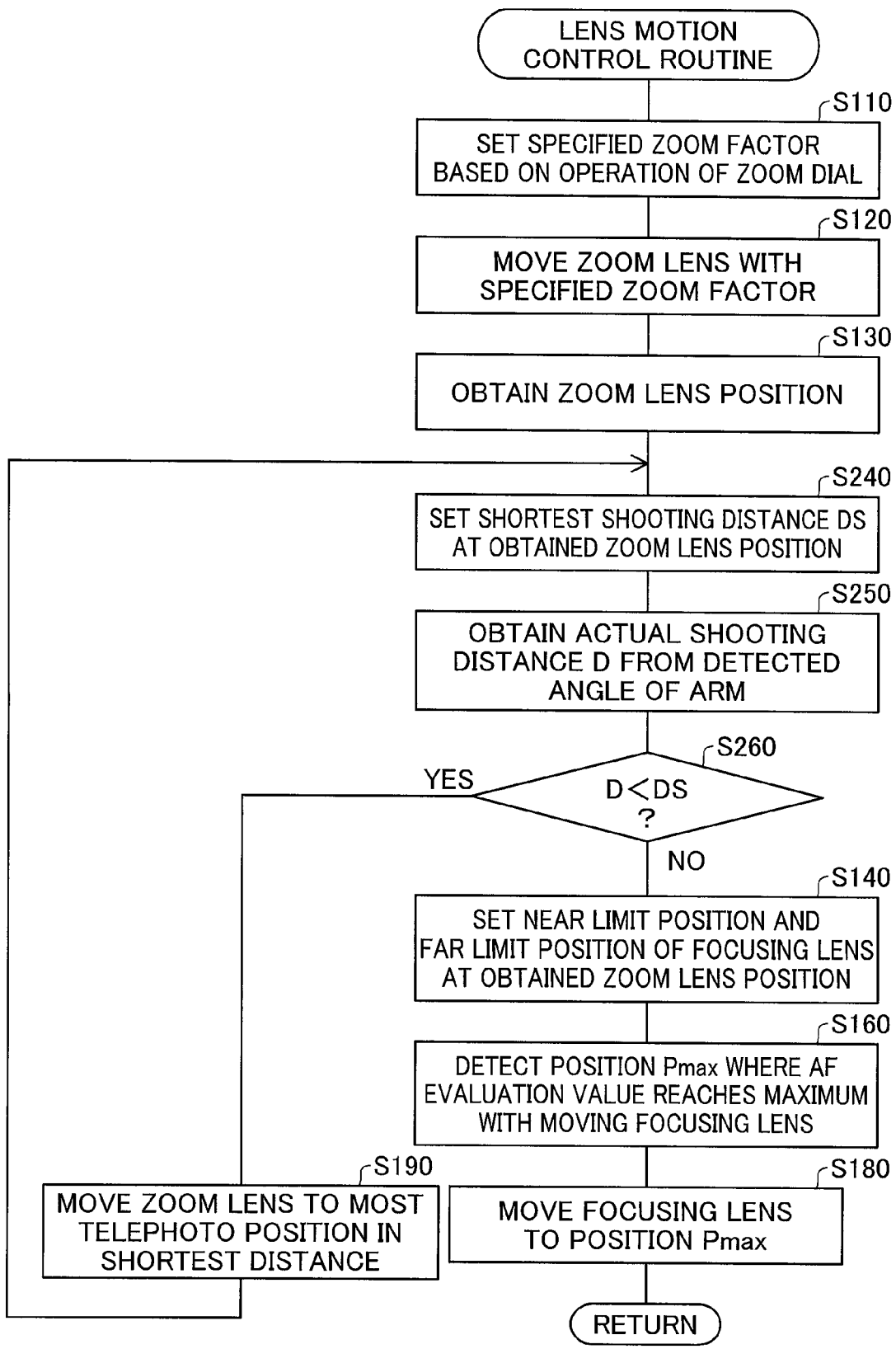
FIG. 6 is a flowchart showing a procedure of lens motion control routine performed by the microcomputer according to the second embodiment.

FIG. 6 is a flowchart showing a procedure of lens motion control routine performed by the microcomputer 400 according to the second embodiment. In the flowchart of FIG. 6, the same processing as that of the first embodiment is performed at the like steps expressed by the like step numbers to those of the first embodiment. More specifically, the same processing as that of the first embodiment is performed at steps S110 to S130, S140, S160, S180 and S190.

After obtaining the current zoom lens position at step S130, the microcomputer 400 sets a shortest shooting distance DS at the obtained zoom lens position (step S240). The shortest shooting distance DS where the image taken with the CCD 200 is kept in focus is changed depending on the position of the zoom lens 120. The shortest shooting distance where the image of the subject is in focus at each zoom lens position is measured experimentally with successively changing the zoom lens position. The shooting distance means the distance from the subject to the CCD or the imaging plane. The correlation of the shortest shooting distance to the zoom lens position is recorded in the form of a table, and table data representing this table is stored in the memory of the microcomputer 400. At step S240, the microcomputer 400 refers to the table data and reads out and sets the shortest shooting distance corresponding to the zoom lens position obtained at step S130.

After the setting at step S240, the microcomputer 400 obtains the actual distance from the subject to the imaging plane, i.e., actual shooting distance D (step S250), by the procedure described below.

Figure 7:
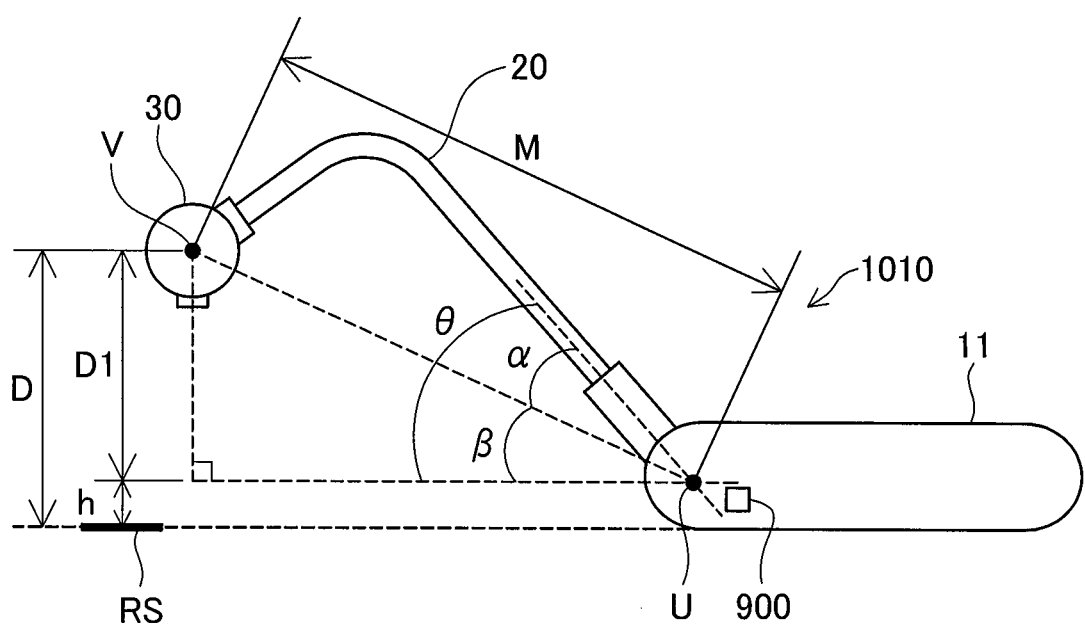
FIG. 7 is a diagram illustrating a procedure of obtaining an actual shooting distance.

FIG. 7 is a diagram illustrating a procedure of obtaining the actual shooting distance D. In the state that the information providing device 1010 is placed on the horizontal plane, such as desktop, the arm 20 is rotatable about an axis U in the vertical plane, and the camera head 30 is rotatable about an axis V in the vertical plane. An angle θ represents the angle between the extending direction of the arm 20 and the horizontal direction including the axis U and is detected by the angle sensor 900 provided in the pivot shaft mechanism 24. More specifically, the angle sensor 900 measures the angle of inclination of the arm 20 to a specified plane of the main unit 11 to detect the angle θ. The specified plane may be, for example, bottom surface. In the illustrated example of FIG. 7, an angle α represents the angle between the axes U-V direction and the extending direction of the arm 20 and is intrinsic to the information providing device 1010. An angle β represents the angle between the axes U-V direction and the horizontal direction including the axis U and is given by subtracting the angle α from the angle θ. A distance M represents the distance between the axes U and V.

A material RS as the subject is placed on the horizontal plane, such as desktop, where the information providing device 1010 is located. On the assumption that the imaging plane of the CCD 200 is located at the position of the axis V, a distance D from the imaging plane to the material RS is given by Equation (1) below:

$$D = D1 + h \quad (1)$$

Here D1 denotes the distance from the axis V to the horizontal plane including the axis U, and h denotes the distance from the horizontal plane including the axis U to the material RS. D1 is given by Equation (2) below:

$$D1 = M \cdot \sin\beta \quad (2)$$
$$\quad = M \cdot \sin(\theta - \alpha)$$

By combining Equation (1) with Equation (2), the distance D from the imaging plane to the material RS is obtained by Equation (3) below:

$$D = M \cdot \sin(\theta - \alpha) + h \quad (3)$$

The distance D obtained by Equation (3) is on the assumption that the imaging plane of the CCD 200 is located at the position of the axis V as mentioned above. The actual shooting distance from the subject to the imaging plane is thus obtainable with correction of the distance in the vertical direction between the assumed position and the actual position. This actual shooting distance is also expressed as D in the following description.

With reference back to FIG. 6, after the acquisition at step S250, the microcomputer 400 determines whether the actual shooting distance D obtained at step S250 is less than the shortest shooting distance DS set at step S240 (step S260). When it is determined that the actual shooting distance D is not less than the shortest shooting distance DS, the microcomputer 400 proceeds to step S140 and performs the focus control in the standard mode by the processing of steps S140, S160 and S180 as described in the first embodiment.

When it is determined at step S260 that the actual shooting distance D is less than the shortest shooting distance DS, on the other hand, the microcomputer 400 proceeds to step S190 to perform the focus control in the macro mode by moving the zoom lens 120 to the wider position to compensate for the shortest shooting distance as described in the first embodiment, and then returns to step S240.

As described above, in response to the operation of the zoom dial 34, the information providing device 1010 of the second embodiment performs the zoom control to move the zoom lens 120 according to the operation amount of the zoom dial 34. When the actual shooting distance obtained from the angle of inclination of the arm 20 detected by the angle sensor 900 is less than the shortest shooting distance at the moved position of the zoom lens 120, the information providing device 1010 of the second embodiment automatically moves the zoom lens 120 to the wider position, in order to focus the image of the subject on the imaging plane.

When the subject is in the close-up distance, the information providing device 1010 of the second embodiment automatically moves the zoom lens to the wider position, in order to focus the image of the subject on the imaging plane. The operator can thus readily and reliably take the image in focus in macro or close-up photography. Additionally, the information providing device 1010 of the second embodiment readily obtains the actual shooting distance D from the subject to the imaging plane from the state of the pivot shaft mechanism 24.

C. Modifications

The foregoing has described the invention in detail with reference to the first and the second embodiments. The invention is, however, not limited to the above embodiments but various modifications and variations may be made to the embodiments without departing from the scope of the invention. For example, the functions implemented by the software configuration may alternatively be implemented by the hardware configuration. Some of other possible modifications are given below.

Modification 1

According to the first and the second embodiments described above, when the target position of the focusing lens 150 is located on the near side of the threshold position PT, the information providing device performs the focus control again after moving the zoom lens 120 to the most telephoto position in the shortest distance. According to another embodiment, the information providing device may gradually decrease the specified zoom factor and perform the focus control on every decrease of the specified zoom factor. More specifically, the lens motion control routine may decrease the current specified zoom factor by a specified rate (for example, 5%), instead of performing step S190 in FIG. 3 or in FIG. 6, and return to step S120 in FIG. 3 or in FIG. 6. This modified lens motion control routine performs the zoom control of step S120 and the focus control of and after step S130 every time the specified zoom factor is decreased by 5%. Repetition of this processing loop gradually moves the zoom lens to the wider position, so as to gradually extend the movable range of FIG. 5 in the near direction and cause the target position XPmax of the focusing lens 150 to be not located on the near side of the threshold position PT. Such modified control changes the magnification to the approximately minimum possible zoom factor that allows the image of the subject to be focused on the imaging plane, and focuses the image of the subject on the imaging plane with the changed magnification. The specified rate of gradually decreasing the zoom factor is not limited to 5% but may be a smaller rate like 1% or 2% or a greater rate like 10% or 20%.

Modification 2

The processing performed when the target position of the focusing lens 150 is located on the near side of the threshold position PT is not limited to the zoom control of step S190 in the first or the second embodiment or decreasing the zoom factor as described in Modification 1 but may be any suitable general operation employed in the macro mode. The general operation in the macro mode may be, for example, replacing the lens with a higher-power lens or changing to the digital zoom. In general, when the target position of the focusing lens is located on the near side of the threshold position, any adequate processing may be performed to move the zoom lens to the wider position than the zoom lens position, to which the zoom lens is moved by the zoom controller, and subsequently move the focusing lens to focus the image.

Modification 3

The first and the second embodiments described above employ the hill-climbing control as the focus control. The focus control is, however, not limited to such hill-climbing control but may be any control to move the focusing lens and thereby focus the image on the imaging plane.

Modification 4

The information providing device 10 shown in FIG. 1 and the information providing device 1010 shown in FIG. 7 are used respectively as the imaging device in the first embodiment and in the second embodiment described above. The information providing device may have any of various other configurations. For example, the information providing device 10 has the arm 20 that does not change its own shape. According to another embodiment, the information providing device may have two arms coupled with each other by a joint to be rotatable about the joint. For example, when the two arms are an upper arm and a lower arm, the information providing device of the second embodiment may be modified to use a first angle sensor of detecting the angle of inclination of the lower arm to the main unit and a second angle sensor of detecting the angle between the lower arm and the upper arm to determine the actual shooting distance. In this modification, a coupling mechanism of the lower arm with the main unit and a coupling mechanism of the lower arm with the upper arm correspond to the adjustment mechanism capable of changing the actual shooting distance. In general, any adequate configuration may be employed to detect the state of the adjusting mechanism capable of changing the actual shooting distance and obtain the actual shooting distance from the detected state of the adjustment mechanism.

Modification 5

The second embodiment and Modification 4 described above obtain the actual shooting distance from the state of the pivot shaft mechanism 24 serving as the adjustment mechanism. According to another embodiment, an ultrasonic sensor may be provided on the camera head 30 to measure the actual shooting distance. In general, the actual shooting distance may be determined on the basis of a detection signal of any adequate sensor.

Modification 6

According to the first and the second embodiments and various modifications described above, the zoom control is performed by moving the zoom lens, and the focus control is performed by moving the focusing lens. According to another embodiment, the zoom control may be performed by changing the shape of the zoom lens, and the focus control may be performed by changing the shape of the focusing lens. According to yet another embodiment, one of the zoom control and the focus control may be performed by moving the corresponding lens, and the other operation may be performed by changing the shape of the corresponding lens. A known example of the lens changing the shape is a liquid lens, which enables the zoom control and the focus control. In general, the zoom controller may "drive the zoom lens", such as move the zoom lens or change the shape of the zoom lens, to change the modification of the image. The focus controller may "drive the focusing lens", such as move the focusing lens or change the shape of the focusing lens, to focus the image on the imaging plane.

Modification 7

The first and the second embodiments and various modifications described above employ the information providing device as the imaging device. The imaging device is, however, not limited to the information providing device but may be any of various other imaging devices, such as a digital still camera, a digital video camera, a digital video camera mounted on cell phone and a network camera.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An imaging device that takes an image of a subject by focusing the image on an imaging plane via an optical system including a zoom lens and a focusing lens, the imaging device comprising:
    an operation input unit configured to input a zoom operation;
    a zoom controller configured to move the zoom lens in response to the input zoom operation, so as to change a magnification of the image;
    a near limit position acquirer configured to obtain a near limit position of the focusing lens to the subject at a zoom lens position, to which the zoom lens is moved by the zoom controller; and
    a focus controller configured to move the focusing lens in such a range that the focusing lens is not located on a near side of the near limit position, every time the zoom lens is moved by the zoom controller, so as to focus the image on the imaging plane, wherein
    when a target position of the focusing lens, which is required to keep the image in focus after the zoom lens is moved by the zoom controller, is located on the near side of a threshold position that is specified based on the near limit position, the focus controller moves the zoom lens to a wider position than the zoom lens position, to which the zoom lens is moved by the zoom controller, and subsequently moves the focusing lens to focus the image.

2. The imaging device according to claim 1, wherein
    the focus controller analyzes the image on the imaging plane to obtain an evaluation value indicating a focal state on the imaging plane, and
    prior to moving the focusing lens to take the image of the subject, the focus controller successively changes a position of the focusing lens with shooting the subject and determines the target position of the focusing lens, based on a variation in evaluation value obtained at every change in position of the focusing lens.

3. The imaging device according to claim 1, wherein the focus controller moves the zoom lens to a most telephoto position in a shortest shooting distance, as moving the zoom lens to the wider position.

4. An imaging device that takes an image of a subject by focusing the image on an imaging plane via an optical system including a zoom lens and a focusing lens, the imaging device comprising:
   an operation input unit configured to input a zoom operation;
   a zoom controller configured to move the zoom lens in response to the input zoom operation, so as to change a magnification of the image;
   a shortest shooting distance acquirer configured to obtain a shortest shooting distance of the subject at a zoom lens position, to which the zoom lens is moved by the zoom controller;
   a focus controller configured to move the focusing lens every time the zoom lens is moved by the zoom controller, so as to focus the image on the imaging plane; and
   an actual shooting distance acquirer configured to obtain an actual shooting distance to the subject, wherein
   when the actual shooting distance is less than the shortest shooting distance, the focus controller moves the zoom lens to a wider position than the zoom lens position, to which the zoom lens is moved by the zoom controller, and subsequently moves the focusing lens to focus the image.

5. The imaging device according to claim 4, further comprising:
   a main unit;
   a camera configured to have the optical system;
   an arm coupled with the main unit and configured to have the camera attached on one end thereof; and
   an adjustment mechanism configured to adjust at least an angle of inclination of the arm to the main unit, so as to change a distance from the subject to the imaging plane, wherein
   the actual distance acquirer obtains the actual shooting distance to the subject from a state of the adjustment mechanism.

6. The imaging device according to claim 4, wherein the focus controller moves the zoom lens to a most telephoto position in a shortest shooting distance, as moving the zoom lens to the wider position.

7. A method of controlling an imaging device that takes an image of a subject by focusing the image on an imaging plane via an optical system including a zoom lens and a focusing lens, the method comprising:
   inputting a zoom operation;
   performing zoom control to move the zoom lens in response to the input zoom operation, so as to change a magnification of the image;
   obtaining a near limit position of the focusing lens to the subject at a zoom lens position, to which the zoom lens is moved by the zoom control; and
   performing focus control to move the focusing lens in such a range that the focusing lens is not located on a near side of the near limit position, every time the zoom lens is moved by the zoom control, so as to focus the image on the imaging plane, wherein
   when a target position of the focusing lens, which is required to keep the image in focus after the zoom lens is moved by the zoom control, is located on the near side of a threshold position that is specified based on the near limit position, the focus control moves the zoom lens to a wider position than the zoom lens position, to which the zoom lens is moved by the zoom control, and subsequently moves the focusing lens to focus the image.

8. A method of controlling an imaging device that takes an image of a subject by focusing the image on an imaging plane via an optical system including a zoom lens and a focusing lens, the method comprising:
   inputting a zoom operation;
   performing zoom control to move the zoom lens in response to the input zoom operation, so as to change a magnification of the image;
   obtaining a shortest shooting distance of the subject at a zoom lens position, to which the zoom lens is moved by the zoom control;
   performing focus control to move the focusing lens every time the zoom lens is moved by the zoom control, so as to focus the image on the imaging plane; and
   obtaining an actual shooting distance to the subject, wherein
   when the actual shooting distance is less than the shortest shooting distance, the focus control moves the zoom lens to a wider position than the zoom lens position, to which the zoom lens is moved by the zoom control, and subsequently moves the focusing lens to focus the image.

* * * * *